(12) United States Patent
Nagashima et al.

(10) Patent No.: US 10,163,544 B2
(45) Date of Patent: Dec. 25, 2018

(54) WIRE HARNESS FOR SUPPRESSION OF VIBRATION OF A CONDUCTIVE PATH

(71) Applicant: YAZAKI CORPORATION, Tokyo (JP)

(72) Inventors: Toshihiro Nagashima, Makinohara (JP); Hideomi Adachi, Makinohara (JP); Takeshi Ogue, Makinohara (JP); Masahide Tsuru, Makinohara (JP); Hiroyuki Yoshida, Makinohara (JP); Kenta Yanazawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/611,252

(22) Filed: Jun. 1, 2017

(65) Prior Publication Data
US 2017/0352449 A1    Dec. 7, 2017

(30) Foreign Application Priority Data

Jun. 3, 2016    (JP) .................................. 2016-111449

(51) Int. Cl.
| | |
|---|---|
| H01B 7/00 | (2006.01) |
| B60R 16/02 | (2006.01) |
| H01B 7/02 | (2006.01) |
| H01B 9/02 | (2006.01) |
| H01B 7/18 | (2006.01) |

(52) U.S. Cl.
CPC ....... H01B 7/0045 (2013.01); B60R 16/0207 (2013.01); B60R 16/0215 (2013.01); H01B 7/0266 (2013.01); H01B 9/024 (2013.01); H01B 7/189 (2013.01)

(58) Field of Classification Search
CPC .. H01B 7/0045; H01B 7/0266; B60R 16/0215
USPC ........................................................ 174/72 A
See application file for complete search history.

(56) References Cited

U.S. PATENT DOCUMENTS

| | | | | |
|---|---|---|---|---|
| 1,104,777 | A | * | 7/1914 | Cobb ....................... D04C 1/06 138/124 |
| 1,999,578 | A | * | 4/1935 | Sidebotham ......... D03D 1/0094 139/384 R |
| 3,126,442 | A | * | 3/1964 | Roberts .................... H01B 7/06 174/113 C |

(Continued)

FOREIGN PATENT DOCUMENTS

| | | |
|---|---|---|
| CN | 103703520 A | 4/2014 |
| CN | 103703640 A | 4/2014 |

(Continued)

OTHER PUBLICATIONS

Office Action dated Sep. 6, 2018 by the State Intellectual Property Office of P.R. China in counterpart Chinese Patent Application No. 201710404554.1.

*Primary Examiner* — Michael F McAllister
(74) *Attorney, Agent, or Firm* — Sughrue Mion, PLLC (57) ABSTRACT

A wire harness includes a conductive path including a braided part and a sheath member accommodating the conductive path so as to protect the conductive path. The braided part is provided as an outermost layer of the conductive path. The braided part includes a cushion part having elasticity in a radial direction of the conductive path and projecting outward in the radial direction toward the sheath member.

9 Claims, 7 Drawing Sheets

(56) References Cited

U.S. PATENT DOCUMENTS

| | | | | |
|---|---|---|---|---|
| 3,463,197 A * | 8/1969 | Slade | ............ | F16L 11/10 |
| | | | | 138/125 |
| 4,030,401 A * | 6/1977 | Hood | ............ | D07B 5/005 |
| | | | | 57/207 |
| 4,484,024 A * | 11/1984 | Bentley, Jr. | ............ | H02G 15/18 |
| | | | | 138/123 |
| 4,754,685 A * | 7/1988 | Kite | ............ | D04C 1/02 |
| | | | | 138/123 |
| 5,712,010 A * | 1/1998 | Russek | ............ | D04C 1/02 |
| | | | | 138/123 |
| 9,702,069 B2 * | 7/2017 | Head | ............ | D04C 1/06 |
| 2011/0297415 A1 | 12/2011 | Katou et al. | | |
| 2013/0068518 A1 * | 3/2013 | Kato | ............ | H02G 3/0462 |
| | | | | 174/350 |
| 2014/0131062 A1 | 5/2014 | Masuda et al. | | |
| 2014/0131095 A1 | 5/2014 | Toyama et al. | | |
| 2014/0220816 A1 | 8/2014 | Adachi et al. | | |

FOREIGN PATENT DOCUMENTS

| | | |
|---|---|---|
| CN | 103890862 A | 6/2014 |
| CN | 104575768 A | 4/2015 |
| CN | 105336408 A | 2/2016 |
| JP | 7-320558 A | 12/1995 |
| JP | 2011-254614 A | 12/2011 |

* cited by examiner

WIRE HARNESS FOR SUPPRESSION OF VIBRATION OF A CONDUCTIVE PATH

CROSS REFERENCE TO RELATED APPLICATIONS

This application is based on Japanese Patent Application (No. 2016-111449) filed on Jun. 3, 2016, the contents of which are incorporated herein by way of reference.

BACKGROUND

The present invention relates to a wire harness and more particularly to a wire harness including a conductive path with a braided part and a sheath member which accommodates and protects the conductive path.

In order to electrically connect together devices mounted on a motor vehicle, a wire harness is used. The wire harness includes a sheath member having a tubular body form and one or a plurality of conductive paths accommodated in the sheath member. For instance, in the wire harness disclosed in below-described patent literature 1, the wire harness is arranged so as to pass under the floor of a vehicle body of a motor vehicle. In the wire harness, a part corresponding to the under-floor of the vehicle is arranged straight. Such a wire harness is formed so as to be long. In the below-described patent literature 1, especially, as for the part arranged straight, a below-described matter is understood. Namely, it is understood that the conductive path in the sheath member is vibrated by a vibration during driving of a vehicle.

[Patent Literature 1] JP 2011-254614 A

SUMMARY

It is therefore to one advantageous aspect of the invention to provide a wire harness which can suppress a vibration of a conductive path in a sheath member and prevent a damage of it.

According to one aspect of the invention, there is provided a wire harness including:

an conductive path including a braided part; and a sheath member accommodating the conductive path so as to protect the conductive path, wherein the braided part is provided as an outermost layer of the conductive path, and the braided part includes a cushion part having elasticity in a radial direction of the conductive path and projecting outward in the radial direction toward the sheath member.

The cushion part may be made of element wires of the braided part.

The cushion part may have a cotton shape.

The sheath member may have a tubular body form.

The sheath member may have a casing body form.

The cushion part may be provided over an entire of the braided part in a longitudinal direction of the conductive path.

The cushion part may be partially provided in the braided part in a longitudinal direction of the conductive path.

The wire harness may further include a vane shaped cushion member which is attached to the braided part and has flexibility.

BRIEF DESCRIPTION OF DRAWINGS

FIGS. 1A and 1B are diagrams showing a wire harness of the present invention.

DETAILED DESCRIPTION OF EXEMPLIFIED EMBODIMENTS

The above-described usual technique has a problem that when the conductive path in the sheath member is greatly vibrated due to the vibration during the driving of the vehicle, the conductive path strongly hits an inner surface of the tube of the sheath member to be damaged.

The present invention is devised by considering the above-described circumstances, and it is an object of the present invention to provide a wire harness which can suppress a vibration of a conductive path in a sheath member and prevent a damage of it.

A wire harness includes one or a plurality of conductive paths and a sheath member which accommodates and protects the conductive paths. The sheath member is configured in a tubular body form or a casing body form. The conductive path has a braided part as a shield member. The braided part is arranged as an outermost layer of the conductive path. In the braided part as the outermost layer, a cushion part is formed over one part or an entire part thereof. The cushion part is formed in such a state as to have an elasticity toward a central direction of the conductive path and expand or swell outward. The wire harness may further include a vane shaped cushion member attached to the braided part and having flexibility.

Figure 1A:
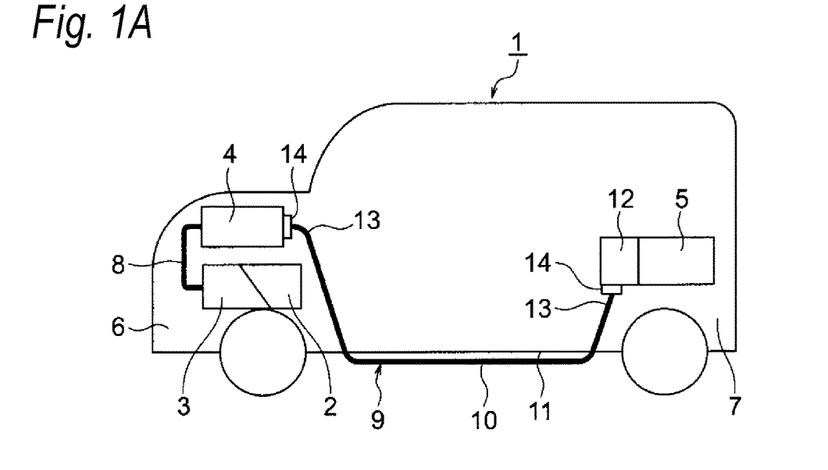
FIG. 1A is a schematic diagram showing an arranged state of a high voltage wire harness.
Figure 1B:
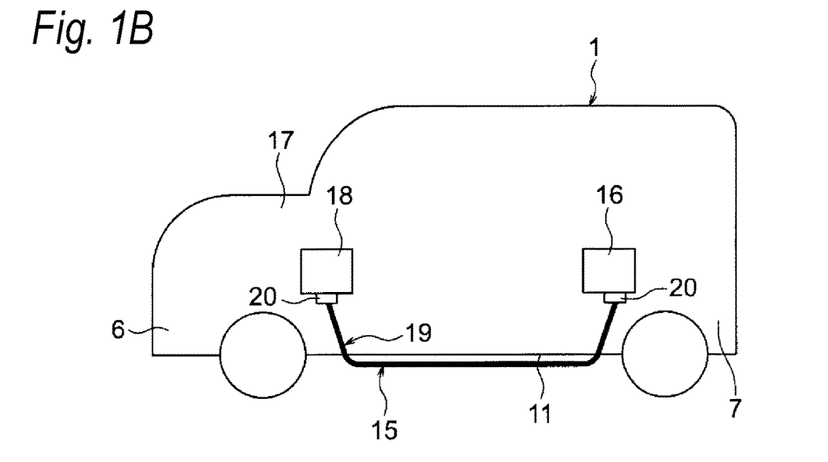
FIG. 1B is a schematic diagram showing an arranged state of a low voltage wire harness different from the wire harness shown in FIG. 1A.
Figure 2:
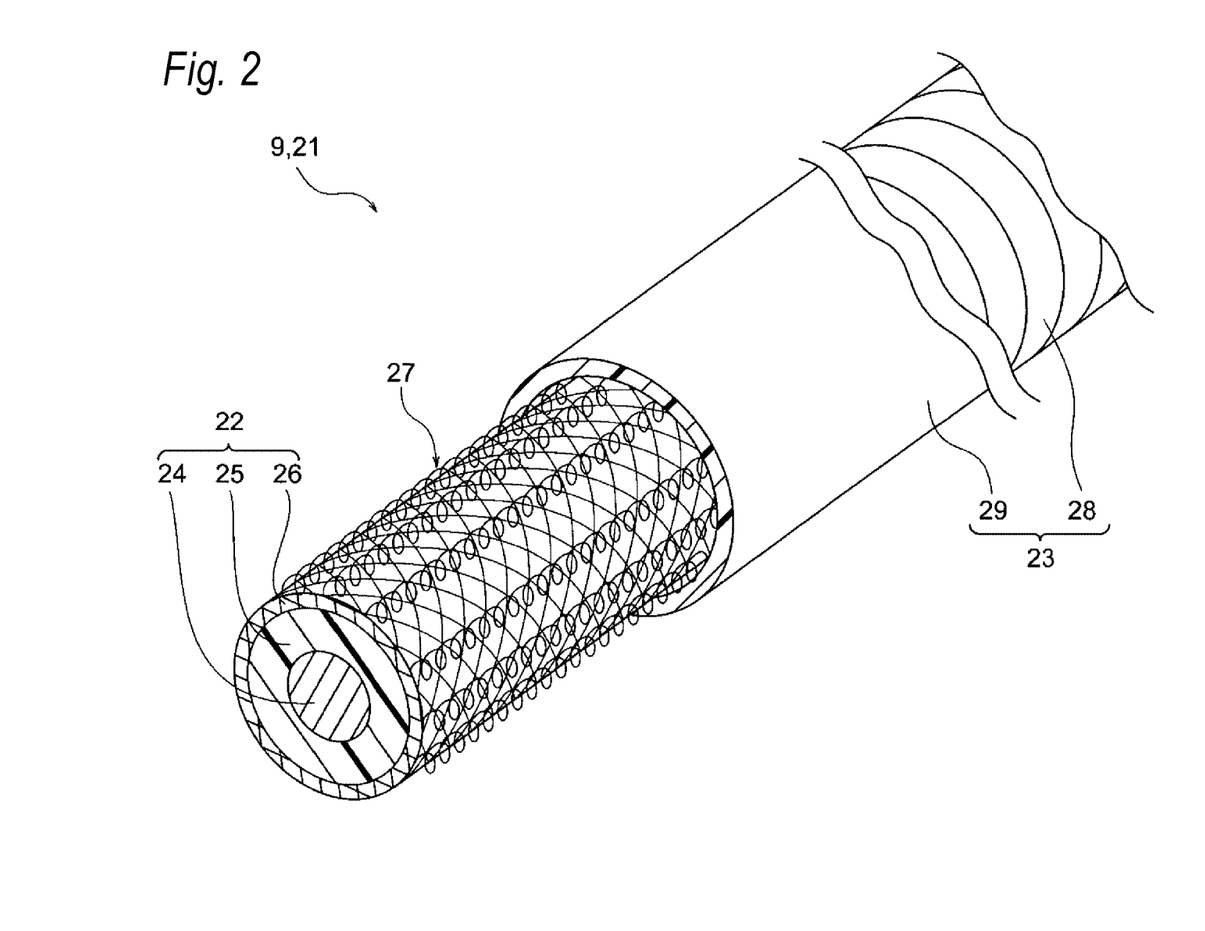
FIG. 2 is a perspective view showing a structure of the wire harness of the present invention (first embodiment).
Figure 3:
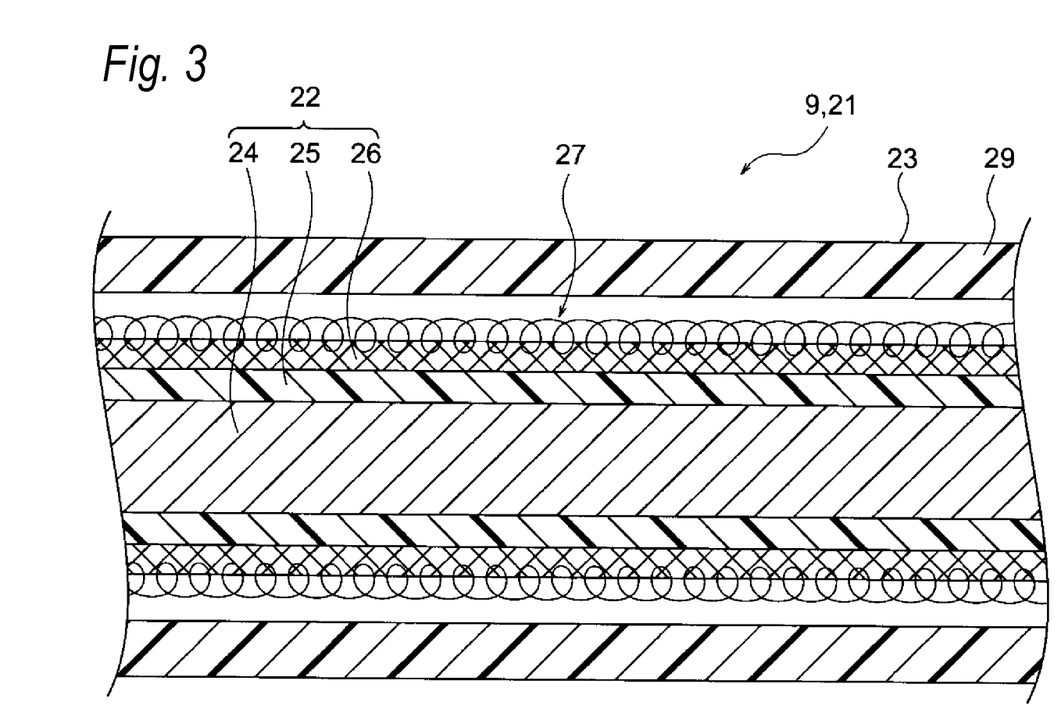
FIG. 3 is a sectional view of the wire harness shown in FIG. 2 (the first embodiment).
Figure 4:
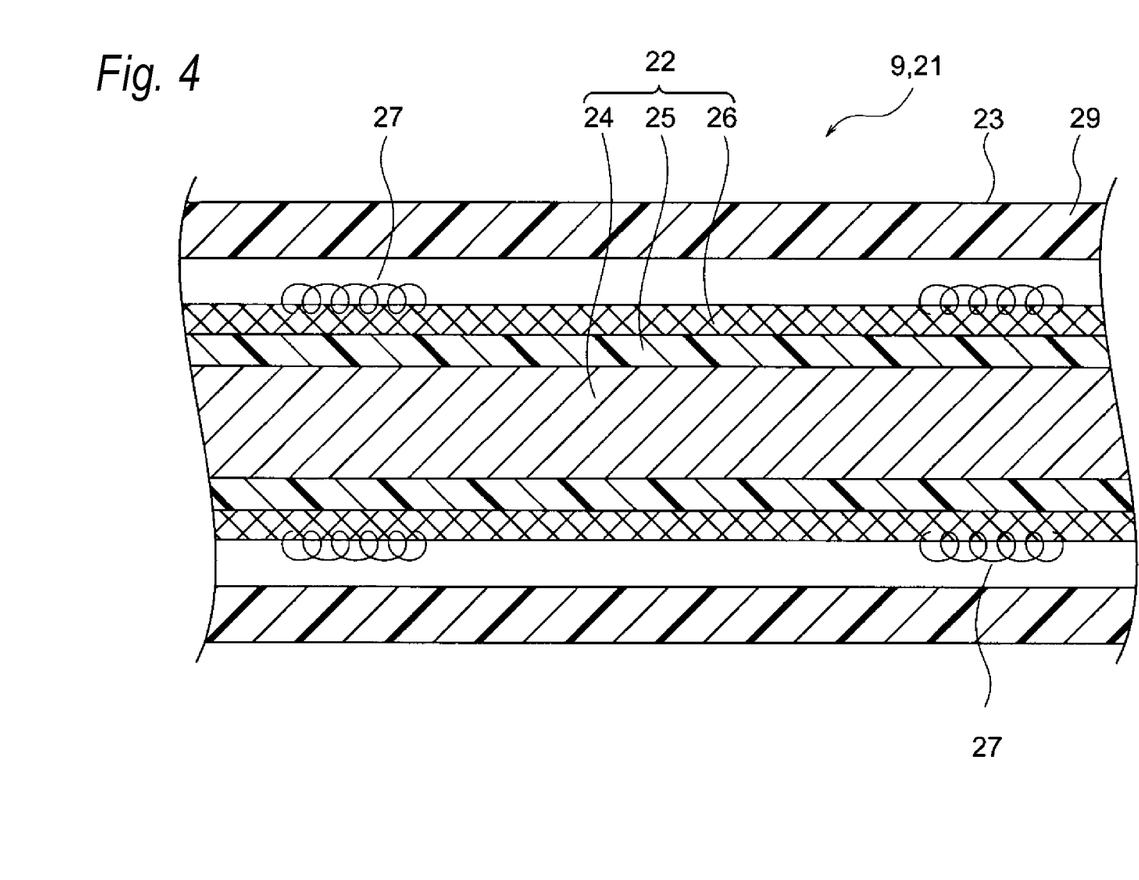
FIG. 4 is a sectional view showing a modified example of a cushion part (the first embodiment).

By referring to the drawings, a first embodiment will be described below. FIGS. 1A and 1B are diagrams showing a wire harness of the present invention. FIG. 1A is a schematic diagram showing an arranged state of a high voltage wire harness. FIG. 1B is a schematic diagram showing an arranged state of a low voltage wire harness different from the wire harness shown in FIG. 1A. FIG. 2 is a perspective view showing a structure of the wire harness of the present invention. FIG. 3 is a sectional view of the wire harness shown in FIG. 2. FIG. 4 is a sectional view showing a modified example of a cushion part In the present embodiment, the present invention is applied to a wire harness arranged in a hybrid motor vehicle. However, the present embodiment can be applied to an electric motor vehicle or an ordinary motor vehicle driven by an engine.

In FIG. 1A, reference numeral 1 designates a hybrid motor vehicle. The hybrid motor vehicle 1 is a vehicle driven by mixing two powers of an engine 2 and a motor unit 3. To the motor unit 3, an electric power from a battery 5 (a battery pack) is supplied through an inverter unit 4. The engine 2, the motor unit 3 and the inverter unit 4 are mounted on an engine room 6 located in a position where front wheels are provided in the present embodiment. Further, the battery 5 is mounted on a rear part 7 of the motor vehicle where rear wheels are provided. The battery may be provided in an interior of the motor vehicle located in a rear part of the engine room 6.

The motor unit 3 is connected to the inverter unit 4 by a high voltage wire harness 8 (a motor cable for a high voltage). Further, the battery 5 is also connected to the inverter unit 4 by a high voltage wire harness 9. An intermediate part 10 of the wire harness 9 is arranged in an under-floor 11 of the vehicle in the vehicle (a vehicle body). Further, the intermediate part 10 is arranged substantially in parallel along the under-floor 11 of the vehicle. The under-floor 11 of the vehicle is a well-known body (a vehicle body) and what is called a panel member and has a through hole formed in a prescribed position. Into the through hole, the wire harness 9 is water-tightly inserted.

The wire harness 9 is electrically connected to the battery 5 through a junction block 12 provided in the battery 5. To the junction block 12, an external connection unit such as a shield connector 14 arranged in a harness terminal 13 of a rear end side of the wire harness 9 is electrically connected. Further, the wire harness 9 is electrically connected to the inverter unit 4 through an external connection unit such as a shield connector 14 arranged in a harness terminal 13 of a front end side.

The motor unit 3 includes a motor and a generator. Further, the inverter unit 4 includes an inverter and a converter in a structure. The motor unit 3 is formed as a motor assembly including a shield case. Further, the inverter unit 4 is formed as an inverter assembly including a shield case. The battery 5 is formed with an Ni-MH type or an Li-ion type and formed as a module. For instance, a storage battery such as a capacitor may be used. It is to be understood that the battery 5 is not especially limited as long as the battery 5 can be used for the hybrid motor vehicle 1 or the electric motor vehicle.

In FIG. 1B, reference numeral 15 designates a wire harness. The wire harness 15 is a low voltage wire harness (used for a low voltage) and provided to electrically connect a low voltage battery 16 in a rear part 7 of a motor vehicle in the hybrid motor vehicle 1 to an auxiliary device 18 (a device) mounted on a front part 17 of the motor vehicle. The wire harness 15 is arranged so as to pass through an under-floor 11 of the vehicle (one example) like the wire harness 9 shown in FIG. 1A and may be arranged so as to pass through an interior side of the vehicle. Reference numeral 19 in the wire harness 15 shows a harness main body. Further, reference numeral 20 designates connector.

In FIGS. 1A and 1B, in the hybrid motor vehicle 1, the high voltage wire harnesses 8 and 9 and the low voltage wire harness 15 are arranged. The present invention may be applied to any of the wire harnesses. However, as a typical example, the high voltage wire harness 9 is adopted and described below. Initially, a composition and structure of the wire harness 9 will be described below.

As shown in FIG. 1A and FIG. 2, the long wire harness 9 arranged so as to pass through the under-floor 11 of the vehicle includes a harness main body 21 and the shield connectors 14 (the external connection units) respectively arranged in both the terminals (the harness terminals 13) of the harness main body 21. Further, the wire harness 9 includes a clamp not shown in the drawing in order to arrange the wire harness itself at a prescribed position and a stop member (for instance, a grommet) which is not shown in the drawing.

In FIG. 2 and FIG. 3, the harness main body 21 includes a long conductive path 22 and a sheath member 23 which accommodated and protects the conductive path 22. The number of the conductive path 22 shows one example, and may be set to two or more. As for the sheath member 23, the sheath member 23 having such a structure as to accommodate and protect the low voltage wire harness 15 together may be used.

Initially, the conductive path 22 and the sheath member 23 in the harness main body 21 will be described below. Then, a manufacturing method of the wire harness 9 and an operation of a cushion part 27 will be described below.

In FIG. 2 and FIG. 3, the conductive path 22 includes an electrically conductive conductor 24, an insulating insulator 25 with which the conductor 24 is coated and a braided part 26 which exhibits a shield function. That is, the braided part 26 performs as a shield member. Namely, the conductive path 22 having no sheath is used. Since the sheath is not provided in the conductive path 22, the conductive path 22 can be the lighter. Since the conductive path 22 is long, the conductive path 22 can be made to be extremely lighter than a usual example.

In FIG. 2 and FIG. 3, the conductor 24 is configured in section of a circular form and formed with copper or copper alloy, or aluminum or aluminum alloy. The conductor 24 may have any of a conductor structure formed by twisting element wires or a rod shaped conductor structure with a section of a rectangular form or a circular form (a round form). The conductor 24 is a conductor structure of a straight angle single core or a round single core for instance. In this case, an electric wire itself has a rod shape. In the above-described conductor 24, the insulator 25 made of an insulating resin material is extrusion-molded on an outer surface.

In FIG. 2 and FIG. 3, the insulator 25 is extrusion-molded on an outer peripheral surface of the conductor 24 by using a thermoplastic resin material. The insulator 25 is configured as a coat with a section of a circular form. The insulator 25 is formed so as to have a prescribed thickness. As the above-described thermoplastic plastic resin, various kinds of well-known thermoplastic resins can be used and are suitably selected from high polymer materials such as a polyvinyl chloride rein, a polyethylene resin, a polypropylene resin or the like.

In FIG. 2 and FIG. 3, the braided part 26 is arranged as an outermost layer of the conductive path 22. Such a braided part 26 is configured in a tubular form by knitting extra fine metallic element wires having an electric conductivity. Further, the braided part 26 is formed in such a configuration and size as to cover an entire part of an outer peripheral surface from one end to the other end of the insulator 25. In the above-described braided part 26, a cushion part 27 is formed. The cushion part 27 is substantially cotton shaped in the present embodiment.

In FIG. 2 and FIG. 3, the cushion part 27 is a part which has elasticity toward a central direction of the conductive path 22 and expands outward. In other words, the cushion part 27 has elasticity in a radial direction of the conductive path 22. The cushion part 27 is made of the element wires of the braided part 26. When the form of such the cushion part 27 is metaphorically said, the element wires of the braided part 26 may be configured in "a form of cotton", "a form of cloud" and "a form of a nest". Further, in other words, the element wires of the braided part 26 are configured in a "fluffy form" or a "bushy form". The cushion part 27 is formed in such a way that the element wires are accurately knitted by a device, an ordinary braided part is, for instance, shut and opened or released or the braided part is simply configured to the above-described forms.

In the present embodiment, as shown in FIG. 2 and FIG. 3, the cushion part 27 is formed over an entire part of the braided part 26. However, the present invention is not limited thereto and the cushion part 27 may be partially formed as shown in FIG. 4.

The cushion part 27 may be preferably supposed to obtain a cushion effect and a spring effect by the metallic element wires of the braided part 26. The metallic element wires can make it difficult to collapse the cushion part. Thus, the effects can be maintained for a long time.

In FIG. 2 and FIG. 3, the sheath member 23 is configured in one straight tubular body form by molding an insulating resin. The sheath member 23 is straight before it is used. Further, the sheath member 23 is configured in a form whose body is not split. In other words, the sheath member 23 is configured in a form having no slits. The sheath member 23 is configured in a form which is not a split tube. Further, the sheath member 23 is configured with a section of a circular form so as to meet the form of the conductive path 22.

The above-described sheath member 23 includes a flexible tube part 28 having flexibility and a straight tube part 29 as a part which arranges the conductive path 22 straight. However, an entire part of the sheath member may be formed with the flexible tube part 28 for instance. A plurality of the flexible tube parts 28 and the straight tube parts 29 are formed in an axial direction of the tube. Further, the flexible tube parts 28 and the straight tube parts 29 are alternately arranged and formed.

In FIG. 2, the flexible tube part 28 is arranged so as to meet a vehicle attaching form. The vehicle attaching form includes a form of a part in which the wire harness is arranged or a form of an object to which the wire harness is attached. Further, the flexible tube part 28 is also formed with such a length as to meet the vehicle attaching form. The length of the flexible tube part 28 is not fixed and respectively formed with a required length so as to meet the vehicle attaching form. Such a flexible tube part 28 is former so that the flexible tube parts 28 may be respectively bent at desired angles under a packed state of the wire harness 9, during its transportation and further when a path to the vehicle is arranged. Namely, the flexible tube part 28 can be bent to have a bending form and can be properly returned to an original straight state as shown in the drawing (a state at the time of molding of the insulating resin). The flexible tube part 28 of the present embodiment is configured in a bellows form (this shows one example).

In FIG. 2 and FIG. 3, the straight tube part 29 is formed as a part which has no flexibility as in the flexible tube part 28. Further, the straight tube part 29 is also formed as a part which is not bent under a packed state, during its transportation and when the path is arranged. The part which is not bent means a part that is not allowed to positively have the flexibility. The straight tube part 29 is configured in a long straight tubular form. An outer peripheral surface of such a straight tube part 29 is configured in a form having no irregularities (this shows one example).

The straight tube part 29 is arranged in a more rigid part than that of the flexible tube part 28. Such a straight tube part 29 is provided with such a position or length as to meet the vehicle attaching form. The longest straight tube part 29 of the plurality of straight tube parts 29, which is not especially shown in the drawing, is formed as a part arranged in the under-floor 11 of the vehicle (see FIG. 1) in the present embodiment.

In the above-described composition and structure, the wire harness 9 is manufactured in such a way as described below (a detailed drawing is omitted). Namely, the wire harness 9 is manufactured in such a way that the conductive path 22 is inserted from one end opening to the other end opening of the sheath member 23 which has an entire part formed with a resin substantially straight. Further, the wire harness 9 is manufactured by attaching the clamp or the grommet, or boots to prescribed positions of an outer surface of the sheath member 23. Further, the wire harness 9 is manufactured by providing the shield connectors 14 in terminal parts of the conductive path 22.

After the wire harness 9 is manufactured as described above, when a bending process is applied thereto so as to fold a prescribed flexible tube part 28, the wire harness 9 is completely packed. The wire harness 9 in a packed state is compact and transported to a vehicle attaching spot under such a compact state.

In the vehicle attaching spot, the wire harness 9 is attached to the object of the vehicle to which the wire harness is attached from a long part corresponding to the under-floor 11 of the vehicle. In the wire harness 9, since the longest straight tube part 29 of the sheath member 23 is arranged in a long part corresponding to the under-floor 11 of the vehicle, the wire harness 9 is attached to the vehicle under a state that a bending is suppressed. At this time, the wire harness 9 is attached to the vehicle with a good working property. After the long part corresponding to the under-floor 11 of the vehicle is fixed by the clamp or the like, while the flexible tube part 28 in the sheath member 23 is flexed (bent), a remaining part is attached to the vehicle. When a series of operations relating to the attachment is finished, the wire harness 9 is arranged in a desired path.

In FIG. 3, in the conductive path 22 inserted into the sheath member 23, a play rate of the conductive path 22 in the sheath member 23 is reduced due to an existence of the cushion part 27. Then, under such a state, when the conductive path 22 in the sheath member 23 is liable to vibrate due to a vibration, for instance, during a driving of the vehicle, the cushion part 27 formed in the braided part 26 collides with an inner surface (an inner peripheral surface) of the tube of the sheath member 23. A collision at this time is absorbed by an elasticity of the cushion part 27. Further, a relative vibration between the conductive path 22 and the sheath member 23 is suppressed and reduced by the existence of the cushion part 27.

As described above by referring to FIG. 1 to FIG. 4, in the wire harness 9 of the present invention, since the conductive path 22 having the braided part 26 formed as the outermost layer is used and the cushion part 27 is formed in the braided part 26, for instance, even during the driving of the vehicle, the vibration of the conductive path 22 in the sheath member 23 can be effectively absorbed by the elasticity of the cushion part 27. Further, the relative vibration of the conductive path 22 and the sheath member 23 can be also effectively suppressed (reduced). Accordingly, in the wire harness 9 of the present invention, the vibration of the conductive path 22 in the sheath member 23 can be suppressed and a damage of the conductive path 22 can be advantageously prevented at the same time.

Figure 5:
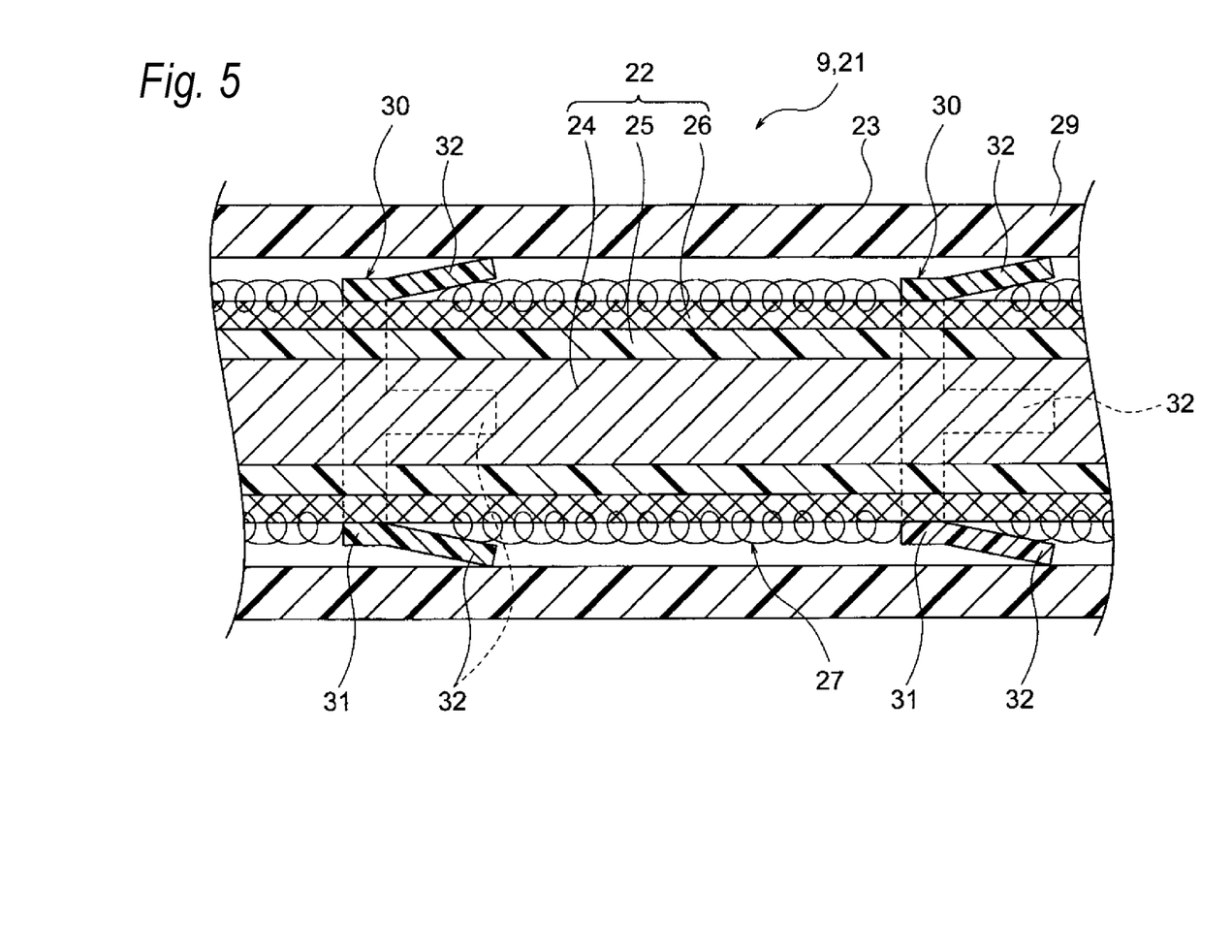
FIG. 5 is a sectional view showing a structure (a structure of a harness main body) of a wire harness of another embodiment (a second embodiment).
Figure 6:
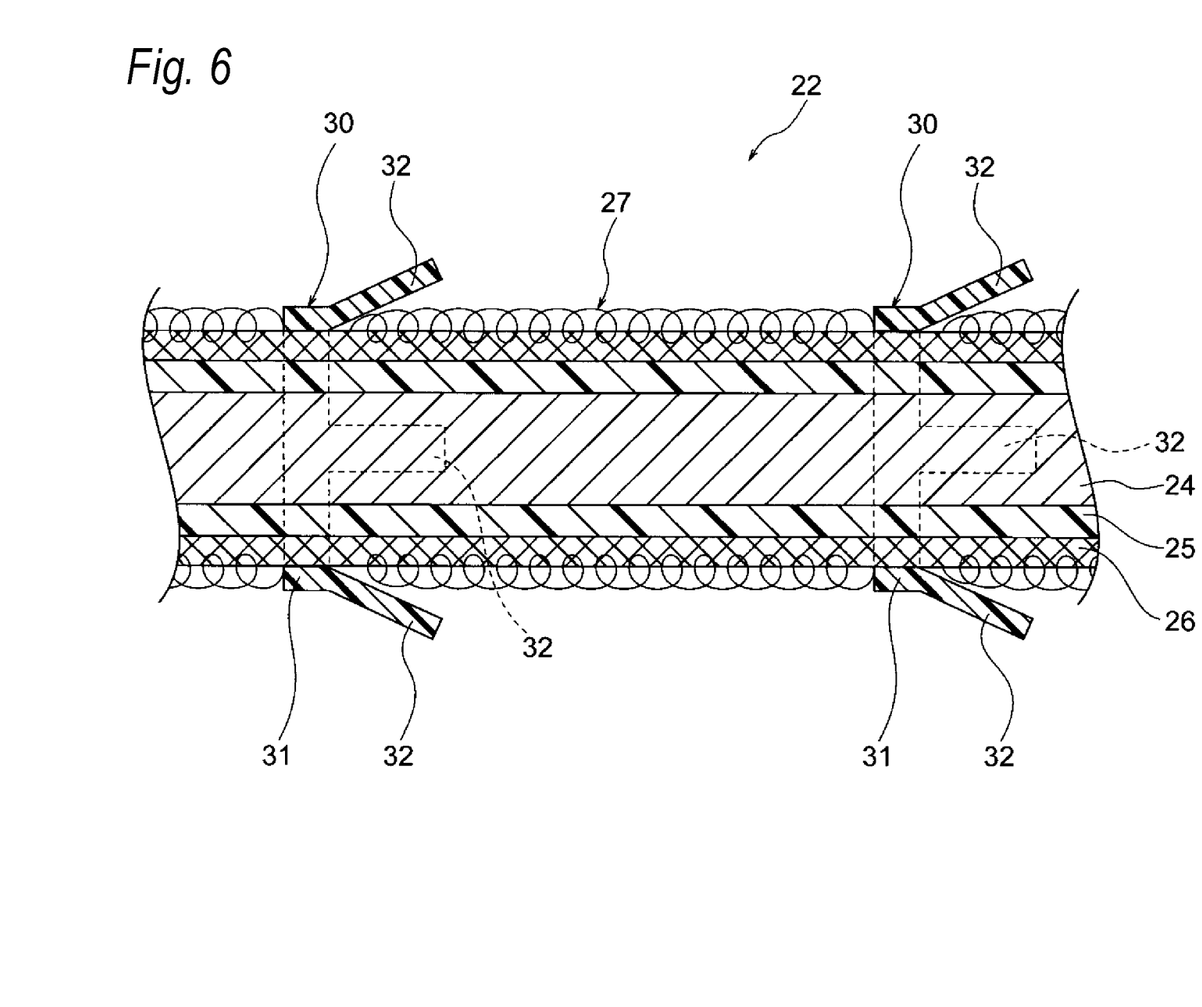
FIG. 6 is a sectional view showing a conductive path to which a vane shaped cushion member is attached (the second embodiment).

By referring to the drawings, a second embodiment will be described below. FIG. 5 is a sectional view showing a structure (a structure of a harness main body) of a wire harness of another embodiment. Further, FIG. 6 is a sectional view showing a conductive path to which a vane shaped cushion member is attached. Component members basically the same as those of the above-described first embodiment are designated by the same reference numerals to simplify an explanation.

In FIG. 5, a harness main body 21 in a wire harness 9 includes a long conductive path 22, a sheath member 23 which accommodates and protects the conductive path 22 and a vane shaped cushion member 30 having a flexibility. The second embodiment is characterized by a point that the vane shaped cushion member 30 is further included.

In FIG. 5 and FIG. 6, the conductive path 22 includes an electrically conductive conductor 24, an insulating insulator 25 with which the conductor 24 is coated and a braided part 26 which exhibits a shield function. That is, the braided part 26 performs as a shield member. Further, in the braided part 26, a cushion part 27 is formed.

In FIG. 5, the sheath member 23 is configured in one straight tubular body form by molding an insulating resin. The sheath member 23 is straight before it is used. Further, the sheath member 23 is configured in a form whose body is not split. In other words, the sheath member 23 is configured in a form having no slits. The sheath member 23 is configured in a form which is not a split tube. Further, the sheath member 23 is configured with a section of a circular form so as to meet the form of the conductive path 22.

The above-described sheath member 23 includes a flexible tube part 28 having flexibility and a straight tube part 29 as a part which arranges the conductive path 22 straight. This structure shows one example. For instance, an entire part of the sheath member may be formed with the flexible tube part 28. A plurality of the flexible tube parts 28 and the straight tube parts 29 are formed in an axial direction of the tube. Further, the flexible tube parts 28 and the straight tube parts 29 are alternately arranged and formed. The flexible tube part 28 can be bent to have a bending form and can be properly formed so as to be returned to an original straight state (a state at the time of molding of the insulating resin).

In FIG. 5 and FIG. 6, the vane shaped cushion member 30 has a substantially vane shape which protrudes outward. The vane shaped cushion member 30 has a flexibility and elasticity toward a central direction of the conductive path 22. In other words, the vane shaped cushion member 30 has elasticity in the radial direction of the conductive path 22. The vane shaped cushion member 30 has a cantilever arm form. Not only the cushion part 27 of the braided part 26, but also the vane shaped cushion member 30 is provided to obtain more a cushion effect. Such a vane shaped cushion member 30 includes an annular attaching part 31 attached to the braided part 26 and a plurality of flexible and elastic parts 32 which protrude obliquely and outward from the annular attaching part 31 and is configured in, for instance, an illustrated form. In the present embodiment, the four flexible and elastic parts 32 are provided at equal pitches in a circumferential direction (the number shows one example). The vane shaped cushion members 30 are provided in the same positions (or pitches) as those of, for instance, the partly formed cushion parts 27 shown in FIG. 4.

In the above-described composition and structure, the wire harness 9 is manufactured in such a way as described below (a detailed drawing is omitted). Namely, the wire harness 9 is manufactured in such a way that the conductive path 22 to which the substantially vane shaped member 30 is attached is inserted from one end opening to the other end opening of the sheath member 23 which has an entire part formed with a resin substantially straight. Further, the wire harness 9 is manufactured by attaching a clamp or a grommet, or boots to prescribed positions of an outer surface of the sheath member 23. Further, the wire harness 9 is manufactured by providing shield connectors 14 in terminal parts of the conductive path 22. The wire harness 9 is packed or a path is arranged in the same manner as that described in the first embodiment.

In FIG. 5, in the conductive path 22 inserted into the sheath member 23, a play rate of the conductive path 22 in the sheath member 23 is reduced due to an existence of the cushion part 27 and the vane shaped cushion member 30. Then, under such a state, when the conductive path 22 in the sheath member 23 is liable to vibrate due to a vibration, for instance, during a driving of the vehicle, the flexible and elastic parts 32 are bent in the vane shaped cushion member 30 which comes into contact with an inner surface (an inner peripheral surface) of the tube of the sheath member 23. At this time, a force of the conductive path 22 which is liable to vibrate is absorbed. Then, if the flexible and elastic parts 32 are largely bent, the cushion part 27 formed in the braided part 26 collides with the inner surface (the inner peripheral surface) of the tube of the sheath member 23. A collision at this time is absorbed by an elasticity of the cushion part 27. In the present embodiment, a relative vibration between the conductive path 22 and the sheath member 23 is suppressed or reduced by the existence of the cushion part 27 and the vane shaped cushion member 30.

As described above by referring to FIG. 5 to FIG. 6, the second embodiment has the same effects as those of the first embodiment. Namely, for instance, even during the driving of the vehicle, the vibration of the conductive path 22 in the sheath member 23 can be suppressed and a damage of the conductive path 22 can be advantageously prevented at the same time.

It is to be understood that the cushion effect can be obtained only by the vane shaped cushion member 30 without providing the substantially cotton shaped part 27 of the braided part 26.

Figure 7:
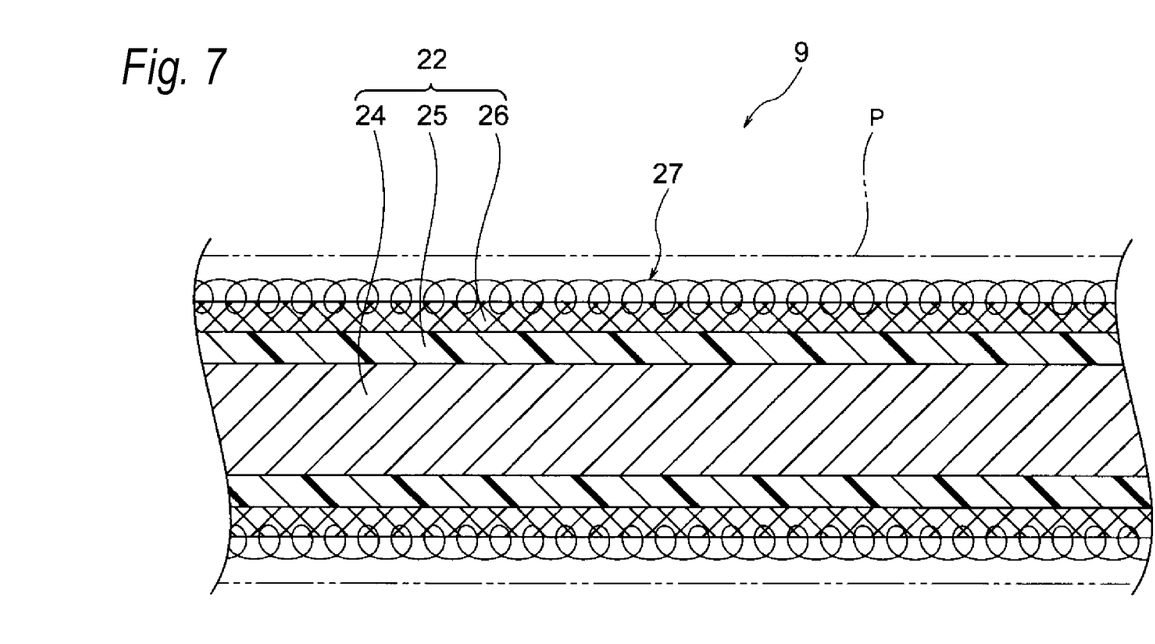
FIG. 7 is a sectional view showing a structure of a wire harness of other embodiment (a third embodiment).

Now, by referring to the drawings, a third embodiment will be described below. FIG. 7 is a sectional view showing a structure of a wire harness of another embodiment. Component members basically the same as those of the above-described first embodiment are designated by the same reference numerals and a detailed description thereof will be omitted.

In FIG. 7, a wire harness 9 includes an conductive path 22 and a casing shaped sheath member (a protector P) which accommodated and protects the conductive path 22. In the braided part 26 of the conductive path 22, a cushion part 27 is formed. The third embodiment is an embodiment which uses the protector P in place of the sheath member 23 in the first embodiment. In addition thereto, an embodiment may be adopted in which a protector P is arranged between sheath members 23.

The third embodiment has the same effects as those of the first embodiment. Namely, for instance, even during the driving of the vehicle, the vibration of the conductive path 22 in the sheath member (the protector P) can be suppressed and a damage of the conductive path 22 can be advantageously prevented at the same time.

Here, features of the above-described exemplary embodiments of the wire harness according to the present invention are respectively briefly summarized in below-described (a) to (h).

(a) A wire harness (8, 9) including:
    a conductive path (22) including a braided part (26); and
    a sheath member (23) accommodating the conductive path (22) so as to protect the conductive path (22), wherein the braided part (26) is provided as an outermost layer of the conductive path (22), and the braided part (26) includes a cushion part (27) having elasticity in a radial direction of the conductive path (22) and projecting outward in the radial direction toward the sheath member (23).

(b) The wire harness (8, 9) as set forth in the above (a), wherein the cushion part (27) is made of element wires of the braided part (26).

(c) The wire harness (8, 9) as set forth in the above (a), wherein the cushion part (27) has a cotton shape.

(d) The wire harness (8, 9) as set forth in the above (a), wherein the sheath member (23) has a tubular body form.

(e) The wire harness (8, 9) as set forth in the above (a), wherein the sheath member (23) has a casing body form.

(f) The wire harness (8, 9) as set forth in the above (a), wherein the cushion part (27) is provided over an entire of the braided part (26) in a longitudinal direction of the conductive path (22).

(g) The wire harness (8, 9) as set forth in the above (a), wherein the cushion part (27) is partially provided in the braided part (26) in a longitudinal direction of the conductive path (22).

(h) The wire harness (8, 9) as set forth in the above (a), wherein the wire harness (8, 9) further includes a vane shaped cushion member (30) which is attached to the braided part (26) and has flexibility.

According to the present invention having the above-described feature, when the conductive path in the sheath member is liable to vibrate due to a vibration, for instance, during a driving of the vehicle, the cushion part formed in the braided part collides with an inner surface of the tube of the sheath member. A collision at this time is absorbed by the elasticity of the cushion part. Further, a relative vibration between the conductive path and the sheath member is suppressed (reduced) by an existence of the cushion part.

According to the present invention having the above-described feature, when the conductive path in the sheath member is liable to vibrate due to a vibration, for instance, during a driving of the vehicle, the vane shaped cushion member attached to the braided part is pressed to the inner surface of the tube of the sheath member to be bent. Thus, a force of vibration is absorbed by the bending. Further, according to the present invention, a relative vibration between the conductive path and the sheath member is suppressed (reduced) by the vane shaped cushion member.

In the present invention according to the above (a), since the conductive path having the braided part formed as the outermost layer is used and the cushion part is formed in the braided part, for instance, even during the driving of the vehicle, the vibration of the conductive path in the sheath member can be effectively absorbed by the elasticity of the substantially cotton shaped part. Further, the vibration of the conductive path can be effectively suppressed (reduced) by the existence of the cushion part. Accordingly, according to the present invention, a damage of the conductive path can be advantageously prevented.

In the present invention according to the above (h), since the vane shaped cushion member is attached to the braided part, for instance, even during the driving of the vehicle, the vibration of the conductive path in the sheath member can be effectively absorbed by the vane shaped cushion member. Further, the vibration of the conductive path can be effectively suppressed (reduced) by the existence of the vane shaped cushion member. Accordingly, according to the present invention, the damage of the conductive path can be more advantageously prevented.

In addition thereto, it is to be understood that various changes may be made within a range which does not change a gist of the present invention.

What is claimed is:

1. A wire harness comprising:
    a conductive path including a conductor, an insulator formed on an outer peripheral surface of the conductor, and a braided part formed on an outer peripheral surface of the insulator; and
    a sheath member accommodating the conductive path so as to protect the conductive path, wherein
    the braided part is provided as an outermost layer of the conductive path, and
    the braided part includes a cushion part having elasticity in a radial direction of the conductive path and projecting outward in the radial direction toward the sheath member.

2. The wire harness as set forth in claim 1, wherein the cushion part is made of element wires of the braided part.

3. The wire harness as set forth in claim 1, wherein the cushion part has a cotton shape.

4. The wire harness as set forth in claim 1, wherein the sheath member has a tubular body form.

5. The wire harness as set forth in claim 1, wherein the sheath member has a casing body form.

6. The wire harness as set forth in claim 1, wherein the cushion part is provided over an entirety of the braided part in a longitudinal direction of the conductive path.

7. The wire harness as set forth in claim 1, wherein the cushion part is partially provided in the braided part in a longitudinal direction of the conductive path.

8. The wire harness as set forth in claim 1, wherein the wire harness further includes a vane shaped cushion member which is attached to the braided part and has flexibility.

9. The wire harness as set forth in claim 1, wherein the braided part is formed by metallic element wires having an electric conductivity.

\* \* \* \* \*